(12) United States Patent  (10) Patent No.: US 7,637,358 B1
Revelino et al.  (45) Date of Patent: Dec. 29, 2009

(54) DEVICE FOR DISENGAGING ELECTRIC MOTOR BRAKE

(75) Inventors: Larry Revelino, Norco, CA (US); Bob Arnett, Mira Loma, CA (US)

(73) Assignee: AL-KO Kober Corporation, Elkhart, IN (US)

( * ) Notice: Subject to any disclaimer, the term of this patent is extended or adjusted under 35 U.S.C. 154(b) by 658 days.

(21) Appl. No.: 11/407,421

(22) Filed: Apr. 19, 2006

Related U.S. Application Data (60) Provisional application No. 60/730,673, filed on Oct. 26, 2005.

(51) Int. Cl.
    F16D 65/36 (2006.01)
(52) U.S. Cl. .............. 188/157; 188/171; 188/216; 296/26.01
(58) Field of Classification Search ......... 188/157, 188/67, 171, 216, 158, 161–163, 173, 106 P; 310/77, 93; 29/596, 732; 296/26.01–26.15; 318/367; 52/67
    See application file for complete search history.

(56) References Cited

U.S. PATENT DOCUMENTS

| | | | |
|---|---|---|---|
| 2,949,172 A | 8/1960 | Simons | |
| 2,966,240 A | 12/1960 | Aude et al. | |
| 3,045,782 A | 7/1962 | Hansen | |
| 3,605,958 A | 9/1971 | McCarthy | |
| 3,688,877 A | 9/1972 | Day | |
| 4,798,269 A | 1/1989 | Lindner et al. | |
| 4,938,321 A | 7/1990 | Kelley et al. | |
| 5,796,192 A | 8/1998 | Riepl | |
| 5,833,296 A | 11/1998 | Schneider | |
| 5,915,507 A | 6/1999 | Maurice et al. | |
| 6,675,940 B2 | 1/2004 | Maurice | |
| 6,971,489 B2 | 12/2005 | Blodgett, Jr. | |

*Primary Examiner*—Pam Rodriguez
(74) *Attorney, Agent, or Firm*—Inskeep IP Group, Inc.

(57) ABSTRACT

A motor and brake assembly having a disengaging mechanism for use with RV's are disclosed. The assembly includes a motor and a disengaging mechanism that is mounted thereon. The disengaging mechanism includes a motor mount comprised of a cylindrical piece with a plurality of holes disposed on the periphery of an outer flange of the cylindrical piece. The cylindrical piece extends over the barrel of the motor and is secured to the barrel with a plurality of screws. Through manipulation of the cylindrical piece, the user can selectively engage or disengage the brake from the motor.

8 Claims, 10 Drawing Sheets

DEVICE FOR DISENGAGING ELECTRIC MOTOR BRAKE

RELATED APPLICATIONS

U.S. Provisional Application Ser. No. 60/730,673 filed on Oct. 26, 2005 entitled Removable Motor Brake For Use With Vehicle Slide Out is incorporated herein by reference.

BACKGROUND OF THE INVENTION

U.S. application Ser. No. 10/720,324 filed on Nov. 21, 2003 entitled Removable Motor Brake For Use With Vehicle Slide Out, is incorporated herein by reference.

A large number of recreational vehicles and recreational trailers (collectively "RV's") currently include compartments that are moved outwardly from the walls of the RV so as to expand the internal living space of the RV. These compartments are typically referred to as slide-outs. It is not uncommon for such slide-outs to substantially enlarge a bedroom or a kitchen area of the RV.

Many of the slide-outs are operated on the RV with an electric motor that is connected to the structural framework of the slide-out. When energized, the motor causes the framework to move along a guide or pathway until the framework extends to its fullest extension, at which point the motor is then deenergized.

Such motors typically include a brake mechanism as an integral part of the motor such that when the motor ceases its operation, the brake automatically engages the slide-out so as to ensure no further movement of the framework of the slide-out. The engagement of this brake, however, can pose problems to the user in those instances when the motor inadvertently fails or in the event electrical power to the motor is unexpectedly interrupted. In those circumstances, the user may desire to move the slide-out manually but will be unable to do so unless the brake is first disengaged. As a result, there is a need for a manual mechanism that enables the user to quickly and easily disengage the brake from the motor so that the user may then manually move the slide-out.

SUMMARY AND OBJECTS OF THE INVENTION

In accordance with this need, the present invention contemplates a motor and brake assembly described in preferred embodiments below. The assembly includes a motor and a disengaging mechanism that is mounted thereon.

It is an object of the present invention to provide a slide-out motor brake which may be manually disengaged.

It is a further object of the present invention to provide an inexpensive motor brake which may be easily and reliably disengaged.

These and other objects not specifically enumerated here that are achieved by the present invention will become evident as more fully described below.

DETAILED DESCRIPTION OF THE INVENTION

Figure 1:
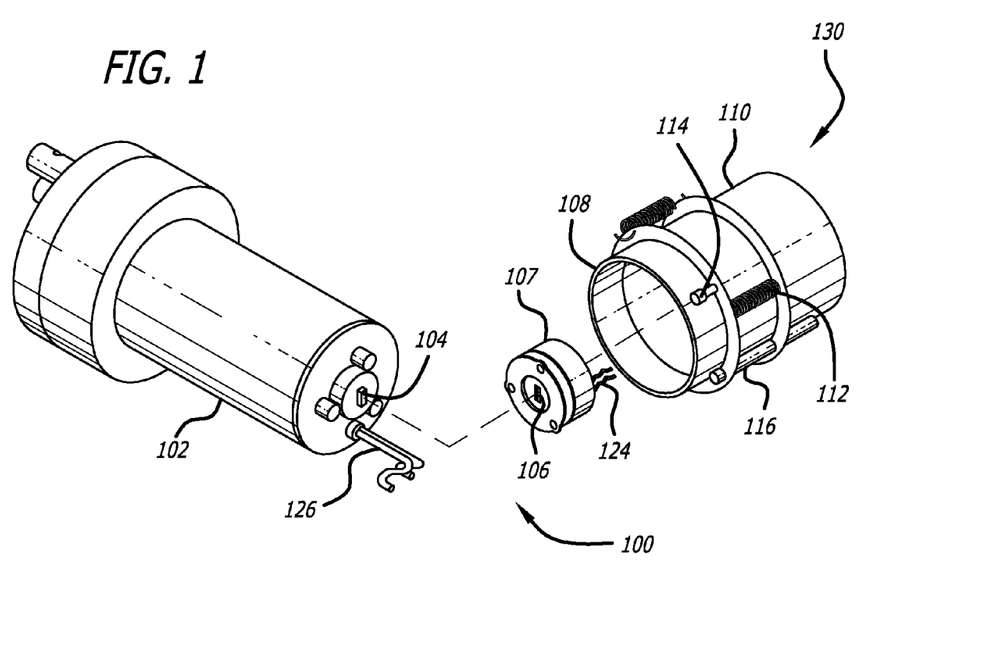
FIG. 1 illustrates a perspective view of a preferred embodiment of a disassembled motor brake according to the present invention.

Referring to FIG. 1, a preferred embodiment of the present invention is depicted. A braking motor assembly 100 is made up of a slide-out motor 102 and a removable braking assembly 130. The motor power cables 126 extend out the backside of the slide-out motor 102, to a control switch and power supply (not shown). A motor key 104 is located on the backside of motor 102, near the motor power cables 126. The motor key 104 is coupled to the drive shaft within the motor. As the motor is energized, the drive shaft rotates. And as the drive shaft rotates, so does the motor key 104.

A variety of motors may be used, so long as the motor is capable of driving the slide-out mechanism on the vehicle and so long as it has a drive shaft coupled to a motor key. The key serves as an engagement surface for said external brake.

Figure 2:
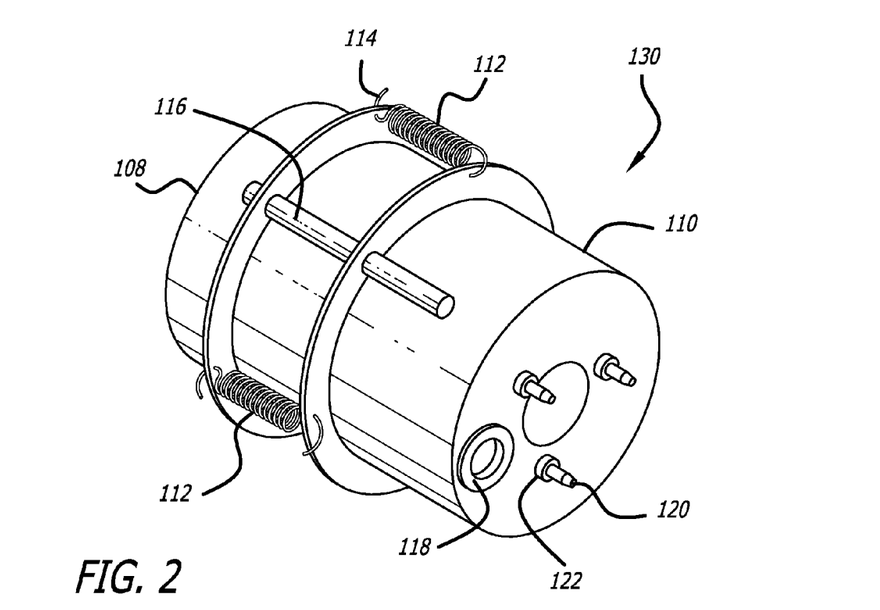
FIG. 2 illustrates a perspective view of a preferred embodiment of the brake assembly according to the present invention.

The brake assembly 130 is best illustrated in FIGS. 1 and 2. A preferred embodiment includes a motor mount 108, a brake housing 110, and a motor brake 107. An exemplary motor brake 107 for use in a preferred embodiment is a brake manufactured by Stearns a division of Rexnord Industries of Wisconsin, model number #b130 OBJY2.

Figure 3:
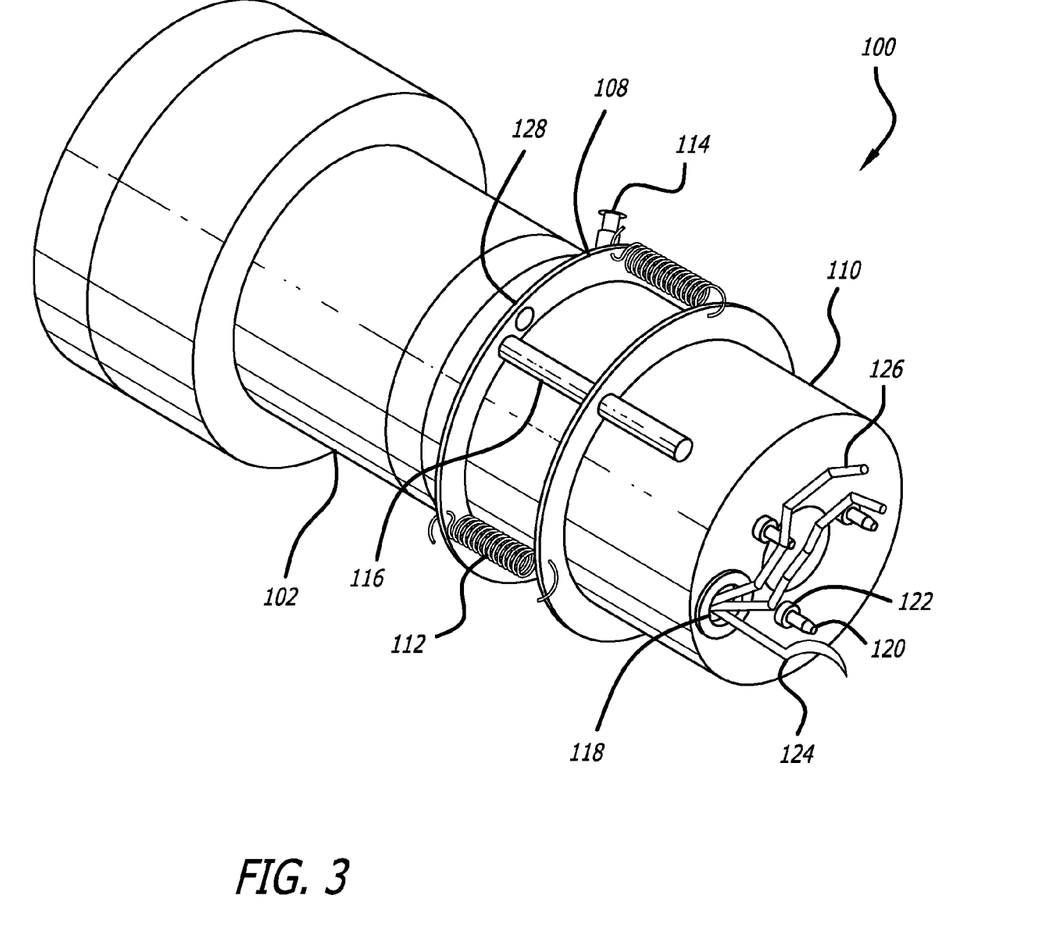
FIG. 3 illustrates a perspective view of a preferred embodiment of the disengaged motor brake of the present invention.

The motor mount 108 is a cylindrical member having a plurality of screw holes disposed on the periphery of the cylindrical member. The cylindrical member extends over the barrel of the motor 102, as best seen in FIG. 3. Mounting screws 114 screw into the plurality of screw holes and further into the barrel of the motor 102, securing the motor mount 108 to the motor.

The brake housing 110 has a cylindrical shape, fitting over both the motor 102 barrel and the motor mount 108. The brake housing 110 locks to the motor mount 108 by multiple locking pins 116 which extend through pin holes 128 in the flange of motor mount 108. The motor mount 108 and brake housing 110 are further secured together by the force of springs 112 which, when attached to the flanges of each member are held in tension, thus compressing the motor mount 108 and the brake housing 110 together.

The motor brake 107 can best be seen in FIG. 1 with a key hole 106 and brake power wires 124 extending out the back. The motor brake 107 is mounted to the interior of brake housing 110 by mounting bolts 120 and mounting nuts 122.

When assembled, motor key 104 is received into key hole 106 of the motor brake 107. When the motor 102 is unenergized, the brake 107 defaults to the locked position, preventing the key hole 106 from rotational movement and thus preventing movement of the motor drive shaft. As a result, the slide-out mechanism is prevented from movement. When the motor 102 is energized, the motor brake 107 is caused to unlock, thus allowing the keyhole 106 to freely rotate with the rotation of the key 104. This then allows free rotation of the motor drive shaft so as to move the slide-out mechanism inwardly or outwardly from the vehicle. In summary, so long as the key 104 is engaged in the key hole 106 of the motor 102, the state of the brake 107 will then dictate whether the slide-out mechanism can be moved by the drive shaft of the motor 102.

Brake assembly 130 may be positioned in an engaged and disengaged position. FIG. 2 illustrates the brake assembly 130 in an engaged position and shows that the engaged position is achieved when the locking pins 116 are positioned within the pin holes 128 in the motor mount 108, preventing rotation of the brake housing 110. In this engaged position, the key 104 of the motor 102 will be engaged within the key hole 106 of the brake 107.

FIG. 3 illustrates the unengaged position of this embodiment. The brake assembly 130 is disengaged by manually pulling the brake housing 110 directly away from the motor mount 108 until the locking pins 116 are completely removed from the pin holes 128. The brake housing 110 is then rotated in either direction. Such rotation prevents the brake assembly from moving back to the engaged position, since the pins 116 and the pin holes 128 are no longer aligned. This movement of the brake assembly 130 also disengages the key hole 106 of the motor brake 107 from the motor key 104 of the motor 102, thus resulting in free rotation of the drive shaft of the motor 102.

Many slide-out mechanisms operate in a fashion similar to the mechanism described herein. Generally these mechanisms have sliding members that slide back and forth on nonmoving members or vehicle structural supports. A slide-out room secures to these moving members, allowing for extension and retraction from the main body of the vehicle.

FIGS. 4 through 7 illustrate a preferred embodiment of such a slide-out mechanism 200 mentioned above. Outer structural members 208 support most of the load of a slide-out room (not shown), while inner structural member 206 provides a mounting area for the braking motor assembly 100. This mounting area can best be seen in FIG. 5 where the motor 102 has been removed to show a drive gear 212 and a shaft gear 210, as well as in FIG. 6 where a motor gear housing 207 encloses this gearing while securing the braking motor assembly 100.

Figures 4, 5, 6:
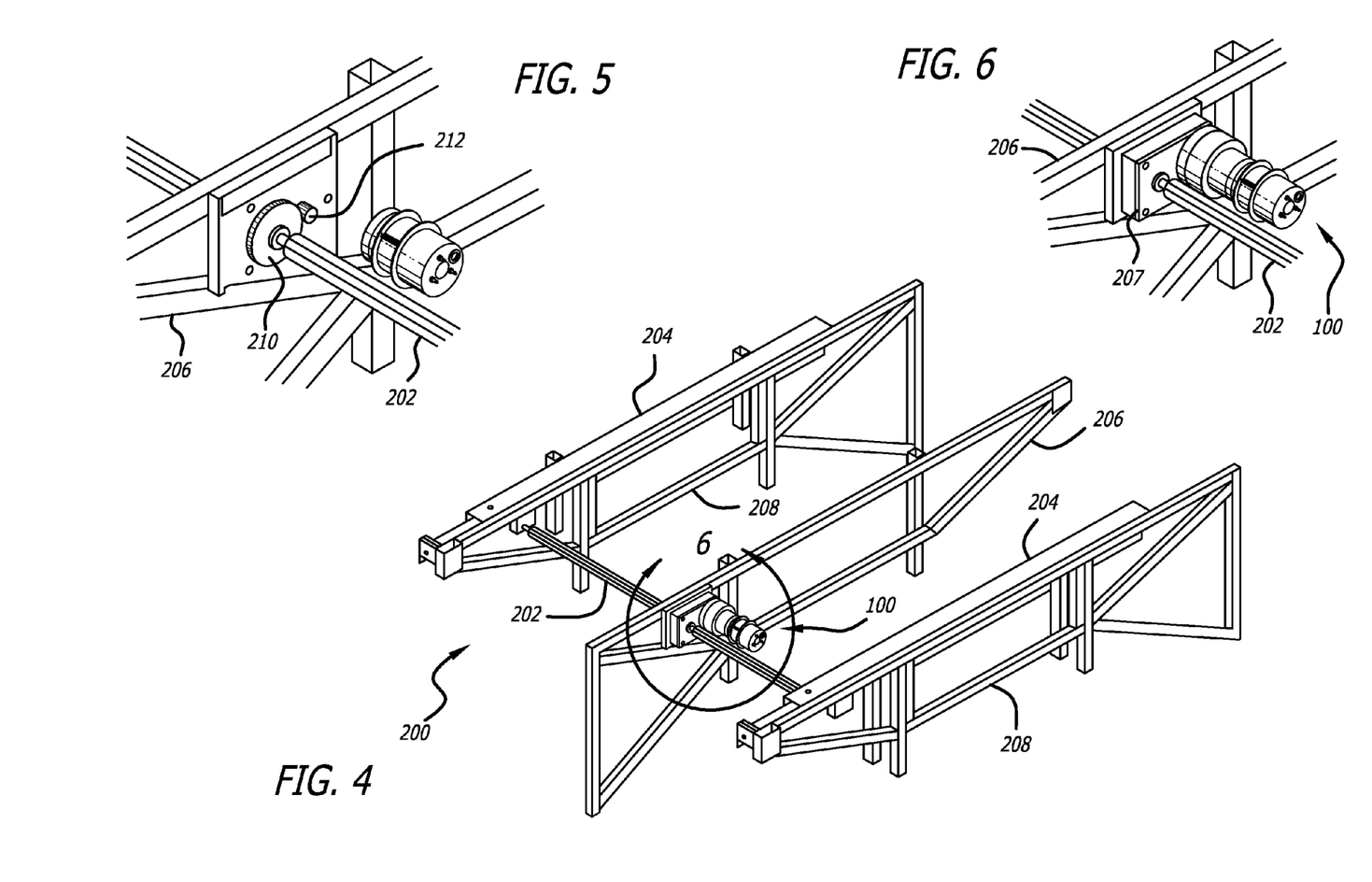
FIG. 4 illustrates a perspective view of a preferred embodiment of the motor brake of the present invention mounted within a typical slide-out assembly.
FIG. 5 illustrates a perspective view of a preferred embodiment of the motor brake slide-out gearing of the present invention.
FIG. 6 illustrates a perspective view of a preferred embodiment of the motor brake slide-out gearing coupled to the motor of the present invention.
Figures 7, 8:
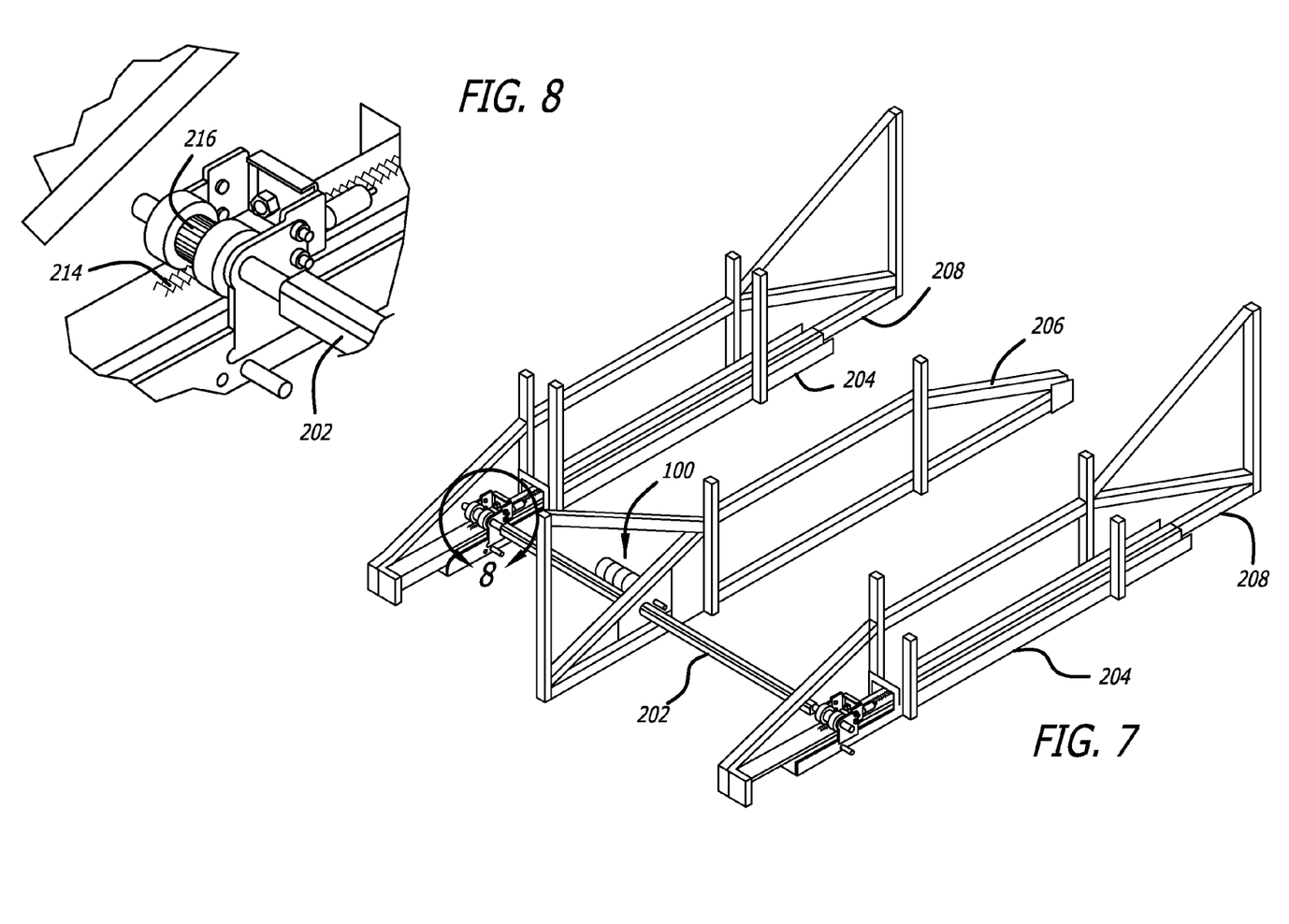
FIG. 7 illustrates a perspective bottom view of a preferred embodiment of the of the slide-out assembly and motor brake of the present invention.
FIG. 8 illustrates a perspective bottom view of a preferred embodiment of the movable ram gearing of the present invention.

The slide-out room (not shown) sits on a top surface of sliding rams 204, being further fastened to each ram 204 with bolts. The rams 204, in turn, are slidably coupled to the top side of the outer structural members 208, extending a substantial length of each. Thus, the rams 204 allow a slide-out room to easily extend out from the main body of a vehicle.

A present preferred embodiment of the slide-out mechanism is driven by the braking motor assembly 100, mounted to the inner structural member 206. The braking motor assembly 100 drives the entire slide-out mechanism 200 from the inner structural member 206 by a series of distribution gears and shafts.

Beginning with the braking motor assembly 100, the drive shaft of motor 102 is coupled to drive gear 212. Drive gear 212 meshes with shaft gear 210, located on the cross shaft 202. The cross shaft 202 is responsible for transferring the rotational energy of the motor 102 to each of the sliding rams 204. Rotational movement is further transferred to the cross shaft 202 since the shaft gear 210 is mounted around the cross shaft 202.

The cross shaft 202 is rotatably mounted within both the outer structural members 208 and inner structural member 206. As the cross shaft 202 rotates, it drives ram gear 216, as best seen in FIG. 8. Positioned underneath the sliding ram 204 is ram gear 216, allowing the gear to mesh with ram gear track 214. The ram gear track 214 extends the length of the underside of each sliding ram and in this manner allows the ram gear 216 to move the sliding ram 204 and thus the slide-out room to an extended or retracted position.

Another popular slide-out mechanism design can be seen in U.S. Pat. No. 6,428,073, the contents of which are hereby incorporated by reference. It is understood that the present invention may utilize a variety of different slide-out mechanisms as long as they are motorized or are capable of becoming motorized.

A disengaging mechanism of the preferred embodiment operates as follows: In the event the user determines that the motor 102 is not usable (e.g. loss of power, motor failure, etc.) and the brake 107 must be disengaged, the user simply pulls on the brake housing 110 (against the force of the springs 112) in a direction away from the motor 102 until the motor key 104 on the drive shaft of the motor disengages the brake keyhole 106 of the brake 107. After pulling a certain distance, the pins 116 will be withdrawn from their corresponding pin hole 128 in the flange of the motor mount 108. Next, the user will rotate the brake housing 110 a sufficient distance (either clockwise or counter clockwise) so that neither the brake key hole 106 nor the elongated pins 116 are in alignment with the motor key 104 and pin holes 128 respectively.

The user then releases the grip on the brake housing 110 causing the tip of the pin 116 to engage the flange on the motor mount and thereby preventing the brake assembly 130 from reengaging with the motor 102. With the motor 102 now being free from the brake 107, the user then is able to manually move the slide-out framework without further resistance from the motor brake.

The user reengages the brake assembly 130 by again pulling the brake housing 110 (against the force of the springs 112) in a direction away from the motor 102 until the locking pins 116 no longer apply pressure to the flange of motor mount 108. The user then rotates the brake housing 110 until the locking pins 116 are once again aligned with their corresponding pin holes 128. Next, the user releases the brake assembly 130, allowing locking pins 116 to enter the corresponding pin holes 116 and brake housing 110 to move closer to motor mount 108. As the brake housing 110 moves closer to the motor 102, the motor brake 107 also moves closer to the motor 102 until key hole 106 reengages with key 104. Once the key hole 106 has reengaged with key 104, braking motor assembly 100 once again operates as mentioned above, allowing the brake 107 to lock the motor 102 when the motor 102 is powered down, thus locking the slide-out room in place when not being extended or withdrawn.

Figure 9:
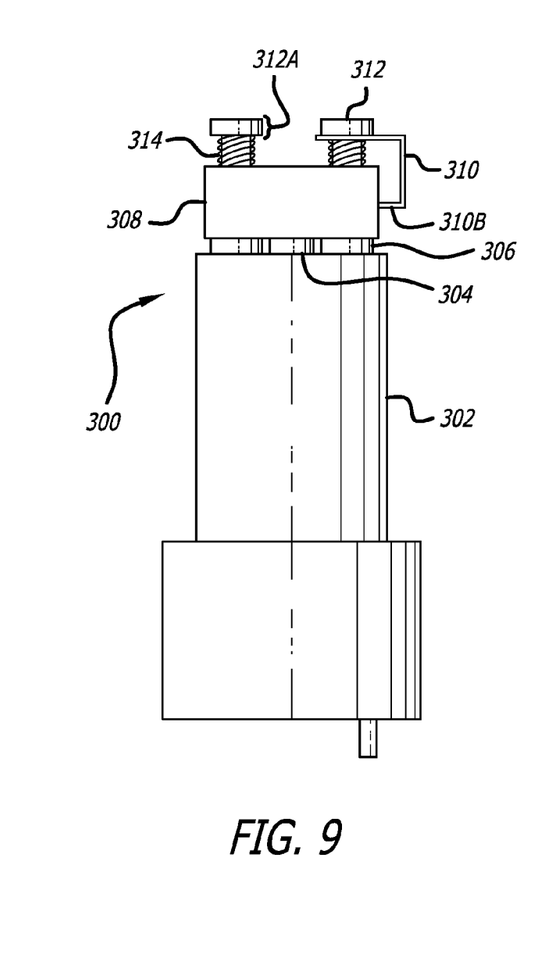
FIGS. 9 and 10 illustrate side views an alternative preferred embodiment of a motor brake assembly according to the present invention.
Figure 10:
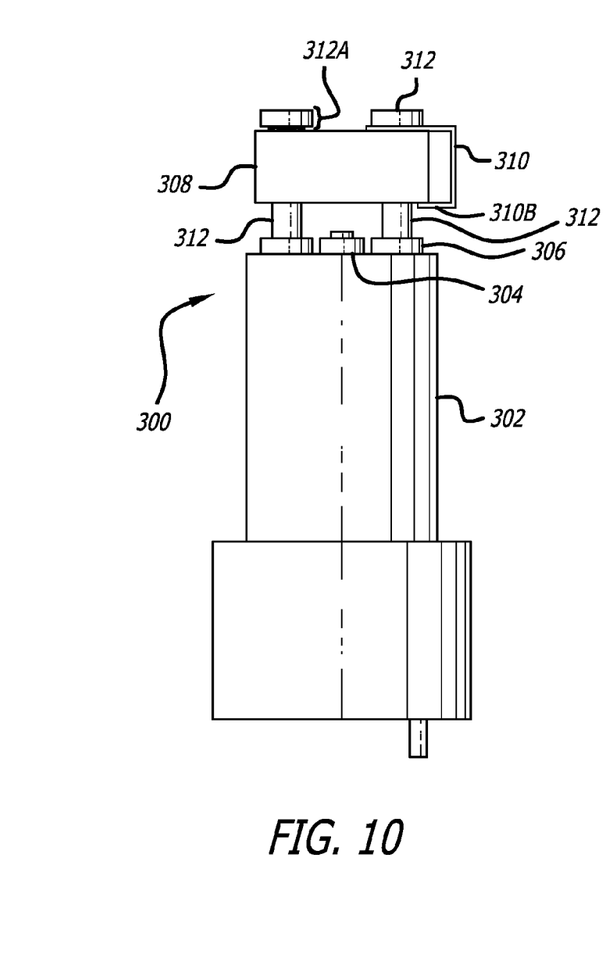

FIGS. 9 and 10 illustrate another preferred embodiment of a motor brake assembly 300 that is generally similar to the previously described embodiments in this application. For example, the motor brake assembly 300 includes a motor 302 and a brake housing 308 which contains a motor brake (not shown) that engages the motor key 304 to selectively lock the motor 302.

However, the motor brake assembly 300 includes two stationary screws 312 that screw into a portion of the motor 302 and remain generally stationary relative to the motor 302.

These screws also pass through apertures in the brake housing 308 which allows the housing 308 to freely move along the length of the screws 312.

Each screw 312 includes a spring 314 disposed over the body of the screw 312 and positioned between a top portion 312A of the screw 312 and the brake housing 308. The springs 314 are sized to press or bias the brake housing 308 towards the motor 302 to press on spacers 306, allowing the brake inside the housing 308 to engage the motor key 304 as with previously described brakes.

Figure 11:
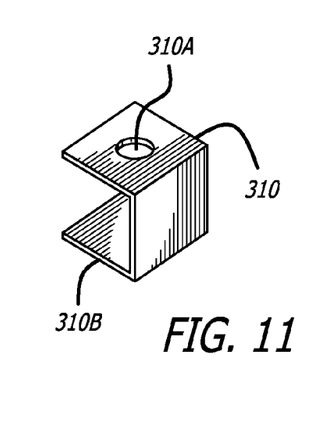
FIG. 11 illustrates a perspective view of the spring clip of FIGS. 9 and 10 according to the present invention.

At least one of the screws 312 also includes a spring clip 310, as seen in FIGS. 9-11, which has an aperture 310A through which the screw 312 passes and threads into. Preferably, the spring clip 310 is positioned between the top portion 312A of the screw 312 and the spring 314. A user can manually pull the brake housing away from the motor 302 (thereby disengaging the brake from the motor 302), against the bias of the springs 314, to allow a lower lip 310B of the spring clip 310 to move under a lower surface of the brake housing 308 and thus retaining the brake housing 308 in retracted or disengaged position. With the brake disengaged in this manner, the user can manually move the slide-out without the brake hindering the manual effort.

It should be understood that the spring clip 310 can be configured in a variety of different shapes and positions, such as having an overall curve shape to match the curved body of the brake housing 308. Additionally, the spring clip 310 can be suspended by other structures or even structures not directly attached to the motor 302. Further, multiple spring clips 310 can be used to retain the brake housing 308.

FIGS. 12-20 illustrate a preferred embodiment of a motor brake removal plate 400 according to the present invention. As seen best in FIG. 17, the removal plate is positioned between the motor brake 414 and the motor 420 to remove the brake 414 from the motor 420. As the user rotates the plate 400, the curved design of the plate 400 lifts or pushes away the electric brake 414 from the motor 420, allowing the motor 420 to freely rotate (i.e. by manual rotation from the user) as previously discussed in other embodiments of this application.

Figure 12:
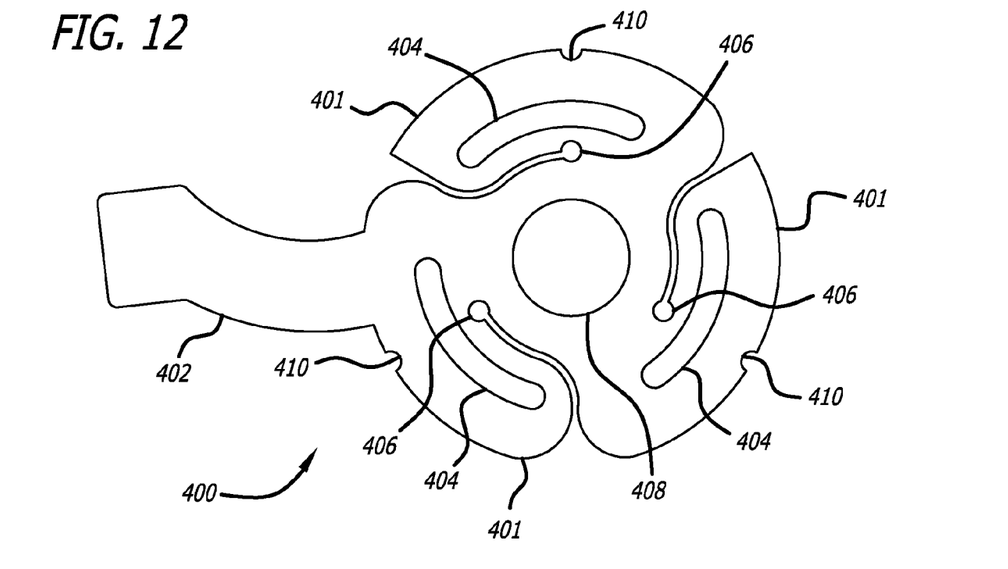
FIGS. 12-20 illustrate various views of a motor brake removal tool.
Figure 13:
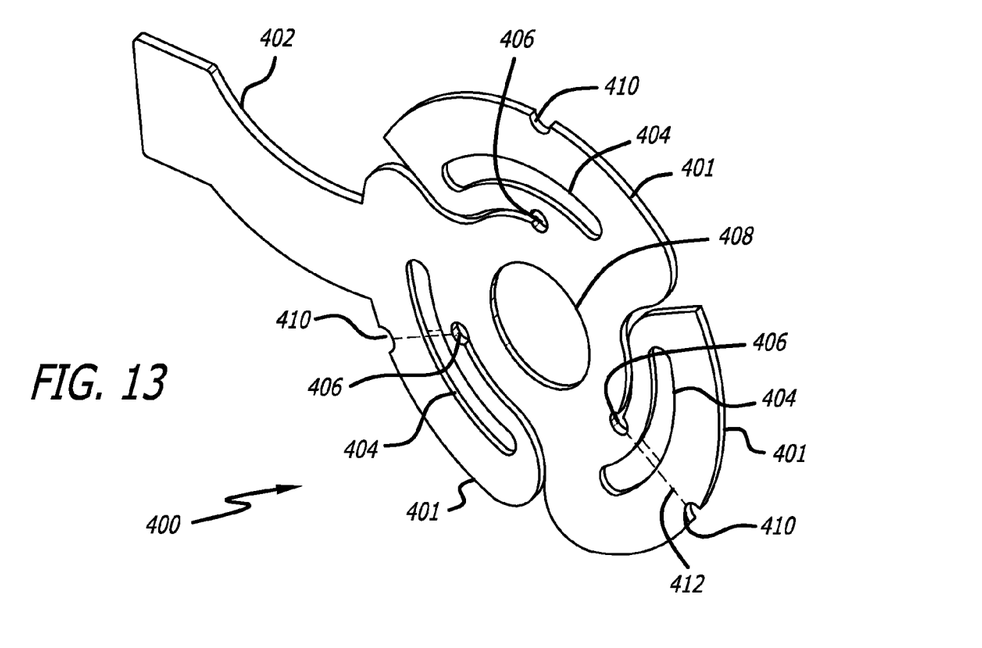

Referring to FIG. 12, the plate 400 has a generally circular shape with an elongated region 402 extending from the side of the plate 400. The center of the plate 400 includes an aperture 408 that allows the motor key portion of the motor 420 (as described in previous embodiments) to pass through.

Figure 14:
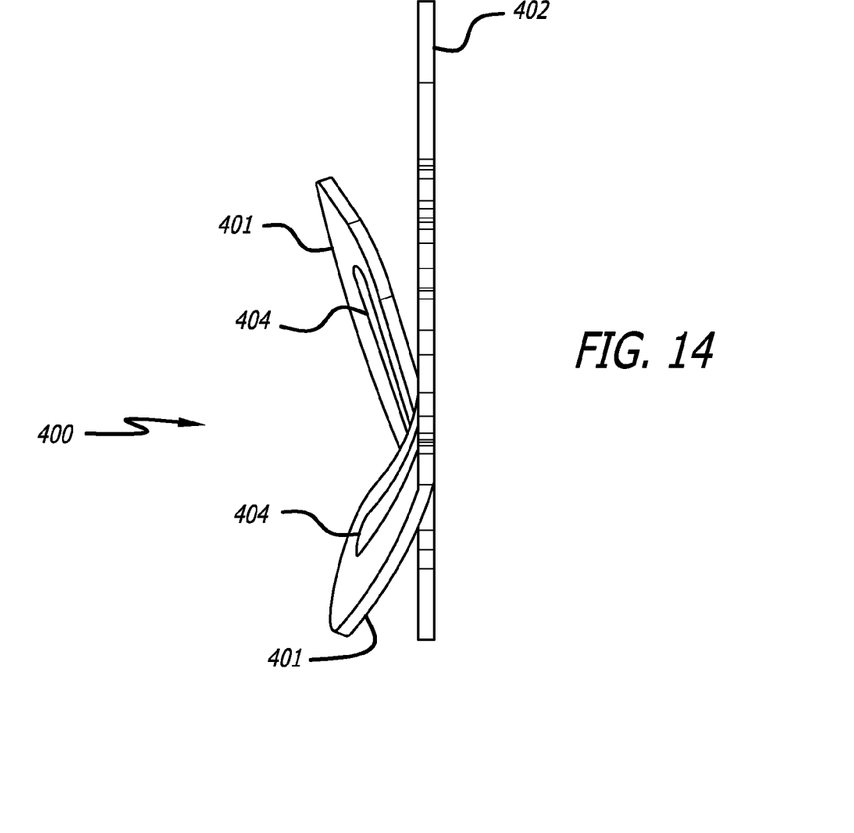
Figure 15:
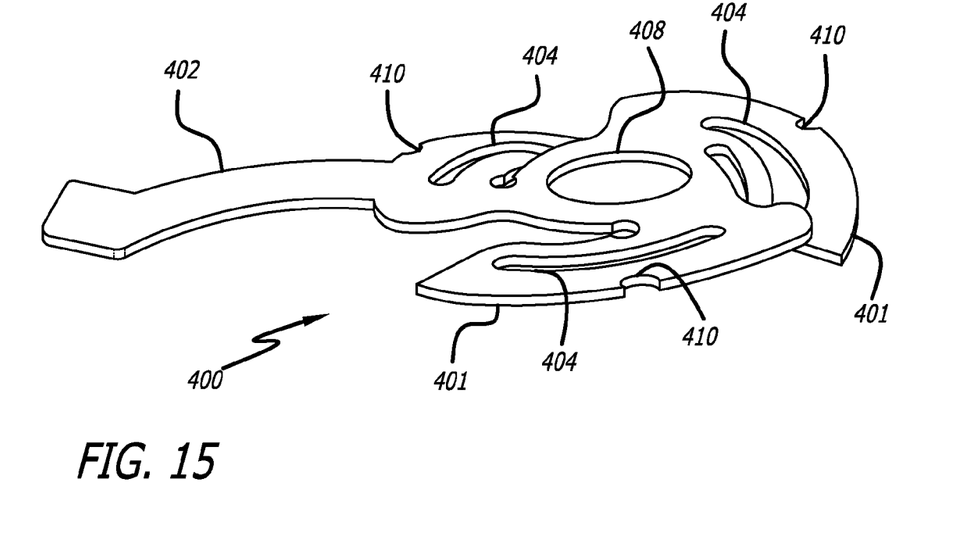
Figure 16:
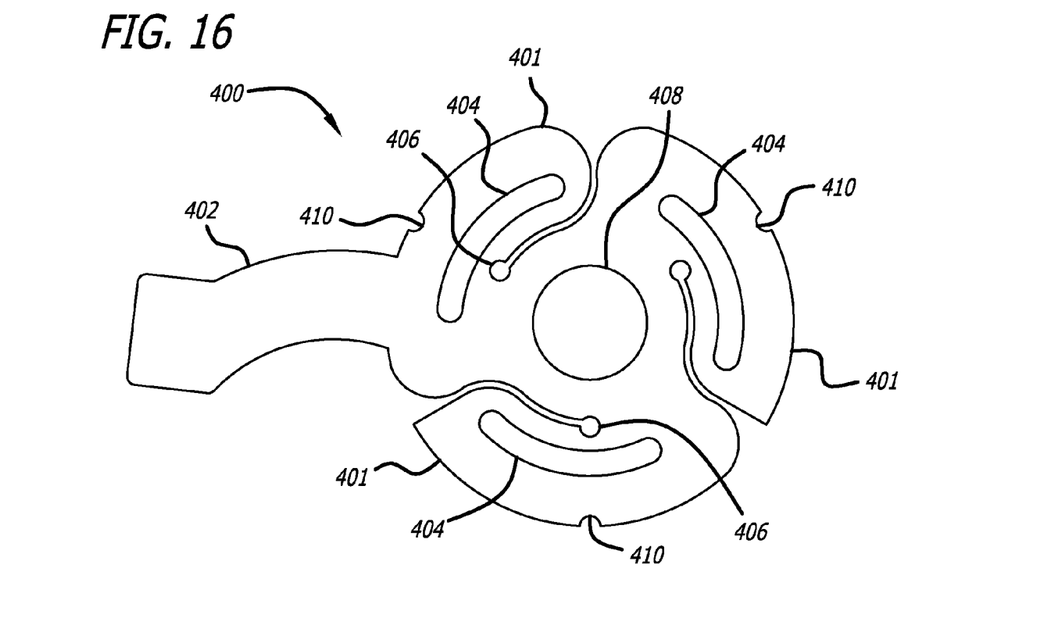
Figure 17:
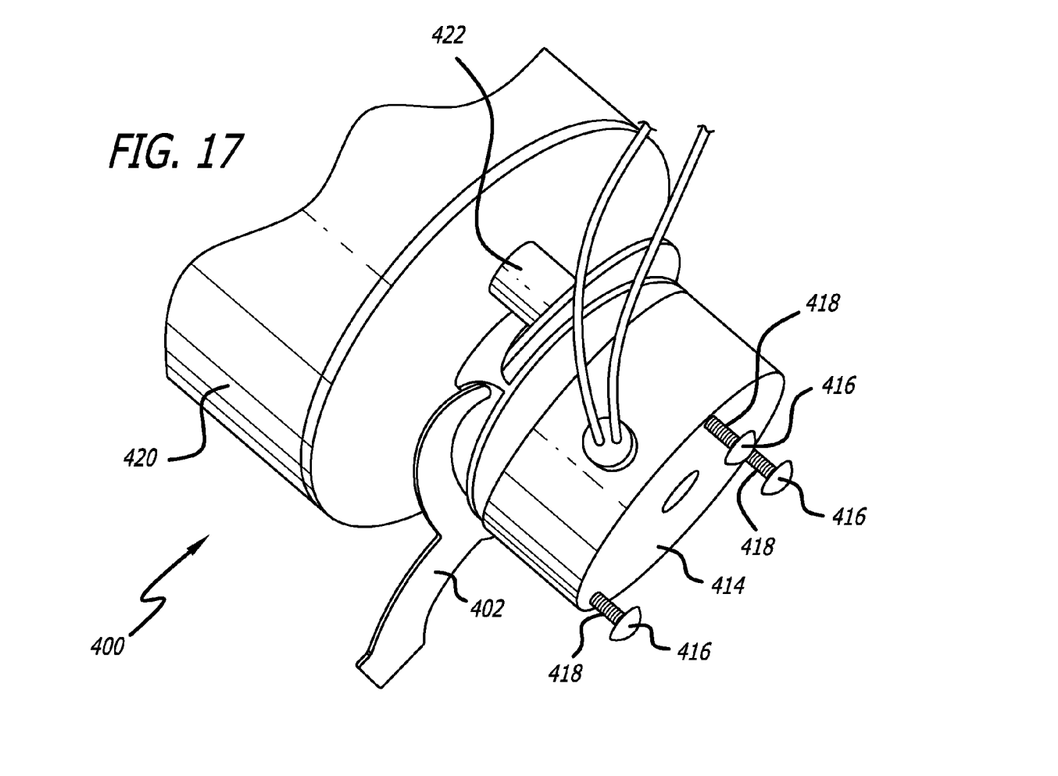
Figure 18:
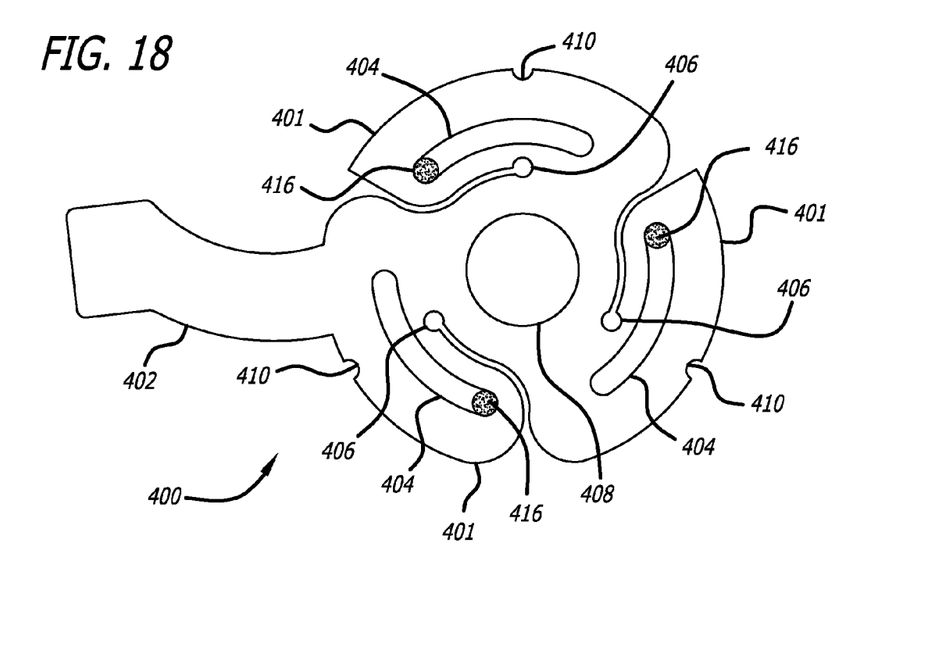

Preferably, the plate 400 includes 3 slots 404 having a curved shape positioned near the outer diameter of the plate 400. The slots 404 have a width large enough to accommodate the stationary bolts 416, as seen in FIG. 18, and to allow the bolts 416 to move along the length of the slot 404. As best seen in FIGS. 14 and 15, the slots 404 are further positioned on cutaway sections of the plate 400 that form arms 401 for each slot 404.

Each arm 401 is bent or angled in the same direction away from the plane of the plate 400, as seen in FIGS. 14, 15, 19 and 20. To facilitate the creation of a bend, each arm 401 includes an inner notch area 406 and an outer notch area 410 that effectively reduces the width of the arm 401. This reduced width area allows a bend to be easily introduced along line 412 in FIG. 13.

Figure 19:
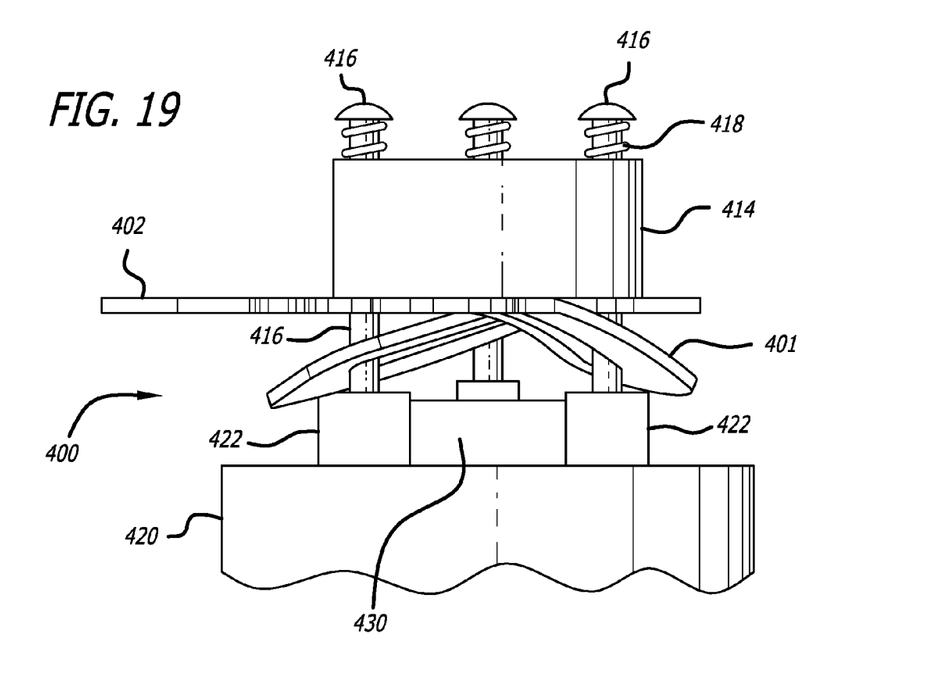
Figure 20:
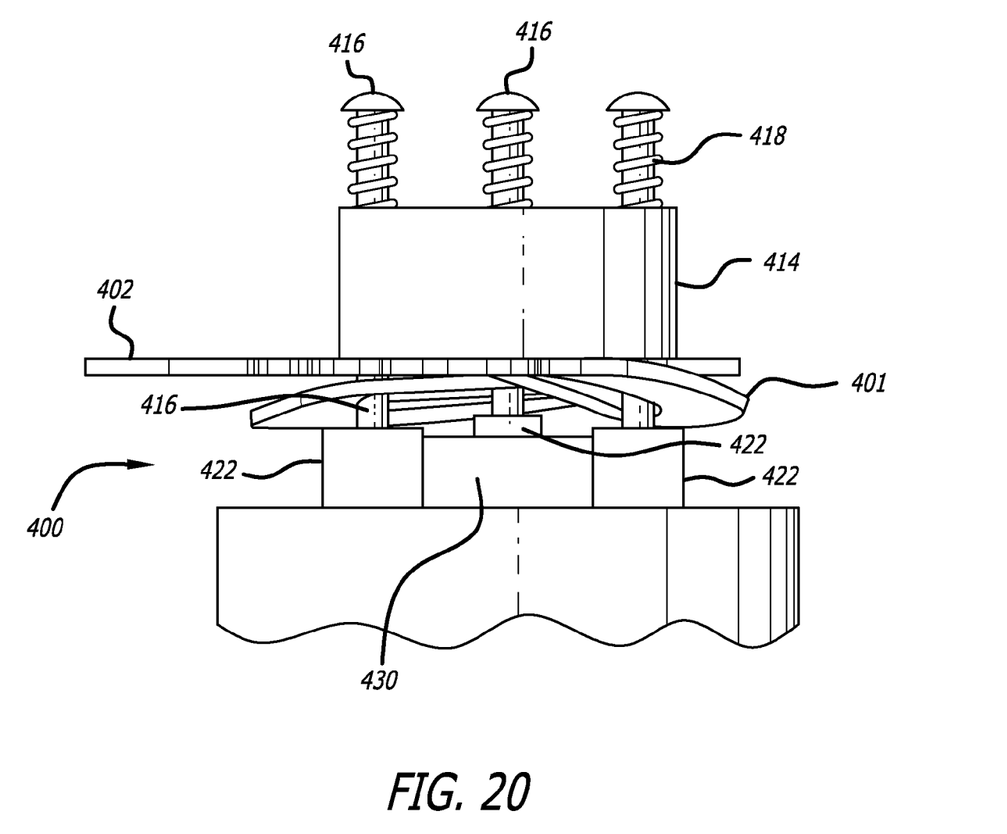

Referring to FIGS. 19 and 20, the stationary bolts 416 pass through the motor brake 414 and the slots 404 of the plate 400, finally positioned into one of three cylinders 422 that extend outward from the motor 420. These cylinders 422 are further positioned around a center key region 430 from which the motor key protrudes and each expose a threaded aperture that accept the stationary bolts 416 (note, the motor key is not shown in these figures in order to more clearly illustrate the design). Additionally, springs 418 are included on the bolts 416, biasing the brake 414 toward the motor 420.

Since the bolts 416 are received along the length of the slots 404, as seen in FIG. 18, the plate 400 can be rotated relative to the motor 420 and the brake 414. In one position seen in FIG. 20, the bent arms 401 are positioned in the space between each cylinder 422. This position allows the brake 414 to remain near the center key region 430 of the motor 420 via the bias of springs 418, ultimately engaging the key (not shown). Thus, the brake 414 can be selectively activated via electrical signals to prevent or allow the motor 420 to rotate.

In a second position seen in FIG. 19, the elongated region 402 is rotated relative to the motor 420 and the brake 414. In this position, the bolts 416 are received in the opposite ends of the slots 404 on the outer curved portion of the arms 401. The ends of the arms 401 push against the tops of the cylinders 422 while the main body of the plate 400 continues to push against the brake 414. In this respect, the bent arms 401 of the plate 400 separate or remove the brake from the selective locking position of FIG. 20, effectively increasing the distance of the brake 414 from the motor 420. Thus, by rotating the plate 400 with the elongated region 402 the user can selectively disengage the brake 414 from the motor 420 as desired.

It should be understood that both the angle that the arms 401 are bent and the length of the arms 401 primarily determine the distance that the brake 414 can be removed from the motor 420. A variety of combinations of angles and lengths are possible, however the brake 414 needs only to be moved a distance great enough to remove the key of the motor 420 from the key hole in the brake 414.

Additionally, while constantly curved slots 404 are shown in this preferred embodiment, other slot shapes are possible. For example, the slot 404 may include a notched area that braces against the bolts 416, locking the plate in a position (i.e. a connected or removed position). Further, these slots 404 can be arranged in different orientations to facilitate linear sliding instead of rotation.

Further, while three bolts 416 are disclosed in the present preferred embodiment, other numbers of bolts are possible. For example, two, four or five bolts 416 can be used.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A motor brake assembly for a slide out mechanism comprising:
   a motor;
   a brake disposed on said motor and movable between a coupled position and an uncoupled position;
   a bias member urging said brake towards said coupled position; and
   a plate positioned between said brake and said motor, said plate being movable to hold said brake in said uncoupled position against a force of said biasing member;
   wherein said plate further comprises a body section and a plurality of arm sections;
   wherein said plurality of arm sections are angled from said body section;
   wherein said plurality of arm sections are angled in a direction upwardly from said body section;

wherein said plurality of arm sections each include a slot;
wherein said slots are each positioned to receive one of a plurality of bolts, said bolts fixed to said motor.

2. The motor brake assembly of claim 1, wherein said brake is connected to said motor through said plurality of bolts.

3. The motor brake assembly of claim 2, wherein said bias member is disposed on at least one of said plurality of bolts.

4. A brake assembly for a motor of a slide-out mechanism of a vehicle comprising:

a slide-out mechanism coupled to move a room of a slide-out vehicle;

a motor coupled to said slide-out vehicle, said motor including an external brake coupling member;

a framework disposed on said motor;

a brake elastically disposed on said framework and movable between a first position coupled to said brake coupling member and a second position disengaged from said brake coupling member;

a brake disengagement member disposed on said framework between said brake and said motor, said brake disengagement member shaped to selectively increase a distance between said brake and said motor and thereby move said brake between said first position and said second position;

wherein said brake disengagement member is a plate including a plurality of curved areas;

wherein said curved areas each include an aperture through which a portion of said framework is disposed.

5. The brake assembly of claim 4, wherein said curved areas are angled towards said motor.

6. The brake assembly of claim 4, wherein said curved areas are angled towards said brake.

7. The brake assembly of claim 4, wherein said apertures of said curved areas are shaped to allow rotational movement of said brake disengagement member.

8. The brake assembly of claim 4, further comprising springs disposed on said framework to bias said brake towards said motor.

* * * * *